US006361241B1

(12) United States Patent
Ferrari et al.

(10) Patent No.: US 6,361,241 B1
(45) Date of Patent: Mar. 26, 2002

(54) BASE FOR QUICK FASTENING OF A HINGE FOR FURNITURE

(75) Inventors: Franco Ferrari, Localitá Deviscio, 2, 23900; Carlo Migli, both of Lecco (IT)

(73) Assignee: Franco Ferrari (IT)

(*) Notice: Subject to any disclaimer, the term of this patent is extended or adjusted under 35 U.S.C. 154(b) by 0 days.

(21) Appl. No.: 09/466,692

(22) Filed: Dec. 20, 1999

(30) Foreign Application Priority Data

Dec. 23, 1998 (IT) ...................................... MI9800822 U

(51) Int. Cl.[7] .................................................. F16B 2/14

(52) U.S. Cl. .............. 403/297; 403/409.1; 403/DIG. 9; 403/DIG. 12; 403/279

(58) Field of Search ......................... 403/297, DIG. 12, 403/DIG. 9, 231, 409.1, 322.4, 321, 274, 279, 281, 374.5, 374.2, 374.1

(56) References Cited

U.S. PATENT DOCUMENTS 5,463,796 A 11/1995 Blum
5,611,637 A * 3/1997 Brustle et al. .............. 403/297
5,613,796 A 3/1997 Salice
5,711,054 A 1/1998 Salice
5,895,103 A * 4/1999 Huber ................. 403/409.1 X
6,106,185 A * 8/2000 Isele et al. .................. 403/297

FOREIGN PATENT DOCUMENTS

EP 0684359 A1 11/1995
EP 0905341 A1 9/1997
GB 2027482 A 2/1990
GB 2340536 A 2/2000

* cited by examiner

*Primary Examiner*—Lynne H. Browne
*Assistant Examiner*—John R. Cottingham
(74) *Attorney, Agent, or Firm*—Shlesinger, Fitzsimmons & Shlesinger

(57) ABSTRACT

A base for fastening of a hinge to a piece of furniture comprises a body (11) from which, at the lower part thereof, a pair of anchors (12) of the radial expansion type for fastening to a piece of furniture and, at the upper part thereof, an element (13) for hooking of the hinge, project. A U-shaped lever (15) has arms connected to the anchors to produce a simultaneous movement of both anchors between a non-expansion position and an expansion position on movement of the lever between a lifted position and a lower position.

Advantageously, the lever can be employed as a handle for easy removal of the base from the piece of furniture.

5 Claims, 2 Drawing Sheets

BASE FOR QUICK FASTENING OF A HINGE FOR FURNITURE

BACKGROUND OF THE INVENTION

The present invention relates to a base for fastening of a hinge to a piece of furniture.

In the art bases provided with screw anchors for fastening of same to the shoulder of the piece of furniture are known. The hinge wing is then secured to these bases. Generally, anchors are of a type provided with an inner element (screw or pin) which, when axially rotated inside the anchor, causes radial expansion of the anchor itself. Also proposed have been lever mechanisms, but operation of same is inconvenient. In addition, the problem of supplying an easy and quick dismantling of the base in case of need has never been solved in a satisfactory manner. In particular, for pulling anchors out of the hole, application of a perfectly axial pulling action to the same would be for example necessary after bringing them to their non-expanded rest condition. This is very difficult with known base conformations.

It is a general aim of the present invention to obviate the above mentioned drawbacks, by providing a fastening base for hinges which is simple, relatively cheap and of easy application, operation and removal.

SUMMARY OF THE INVENTION

In view of the above aim, in accordance with the invention, a base has been conceived for fastening of a hinge to a piece of furniture which comprises a body from which, at the lower part thereof, a pair of anchors of the radial expansion type for fastening to the piece of furniture and, at the upper part thereof, an element for hooking of the hinge, project, characterised in that it comprises a U-shaped lever in which an arm of a U conformation is connected with expansion means of one of the anchors forming the pair and the other arm of the U conformation is connected with expansion means of the other anchor forming the pair to produce the simultaneous movement of both anchors between a non-expansion position and an expansion position, on movement of the lever between a lifted position and a lowered position.

BRIEF DESCRIPTION OF THE DRAWINGS

For better explaining the innovatory principles of the present invention and the advantages it offers over the known art, a possible embodiment applying these principles will be described hereinafter, by way of non-limiting example, with the aid of the accompanying drawings. In the drawings.

DETAILED DESCRIPTION OF THE INVENTION

With reference to the drawings, a base which is employed for fastening of a hinge to a piece of furniture, is shown.

Figure 1:
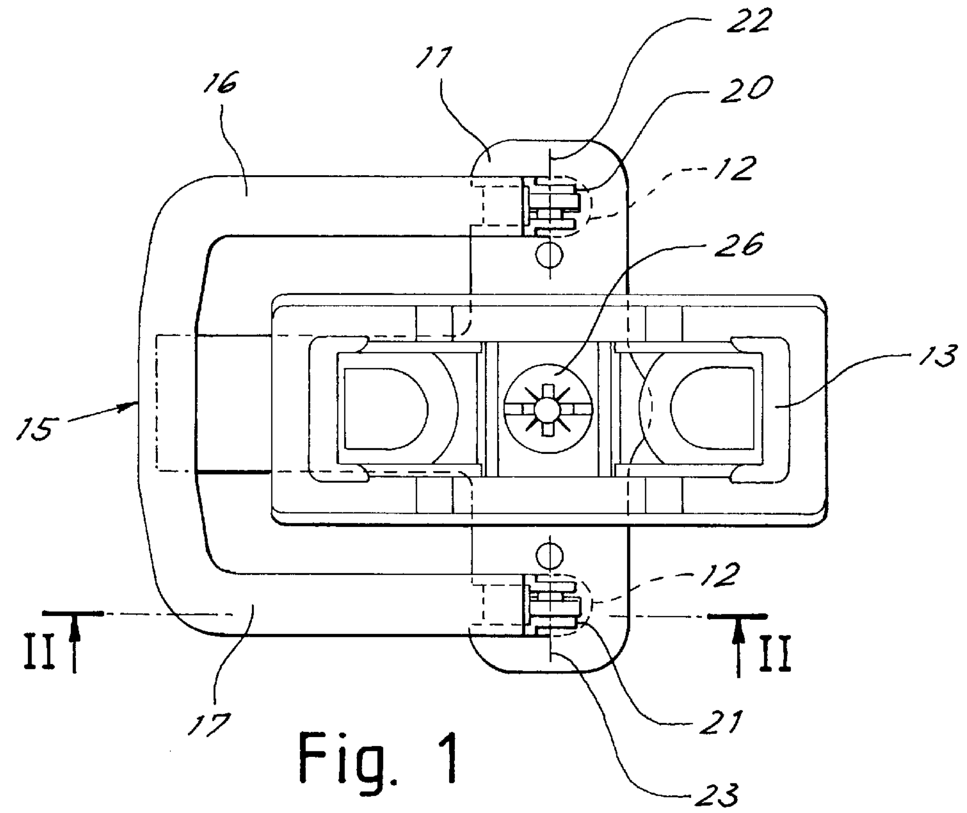
FIG. 1 is a plan view of a base in accordance with the invention in a fastened position.
Figure 2:
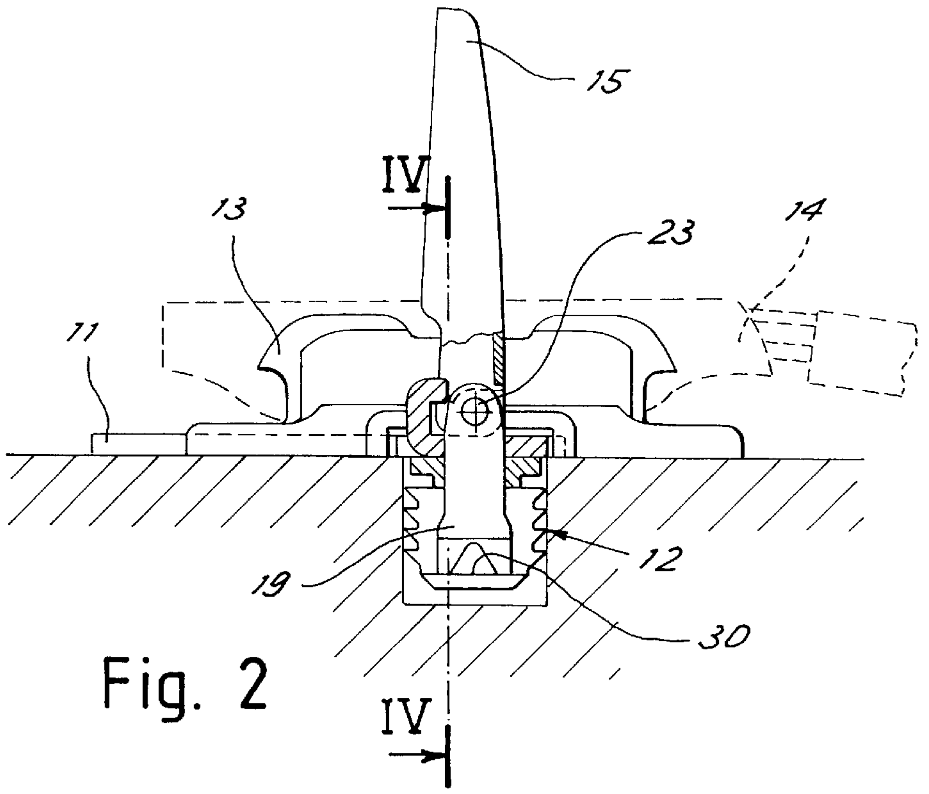
FIG. 2 is a view partly sectioned along line II—II in FIG. 1, of the base in a released position.

The base is comprised of a body 11 from which, at the lower part thereof, a pair of anchors 12 of the radial expansion type for fastening to a piece of furniture, and, at the upper part thereof, an element 13 for hooking of the hinge, project. The hinge, generally denoted by 14 in FIG. 2, is only shown in chain line, because it can be of any known type, as a person skilled in the art can easily imagine. Element 13 will be conveniently shaped for hooking of the hinge thereto.

Figure 3:
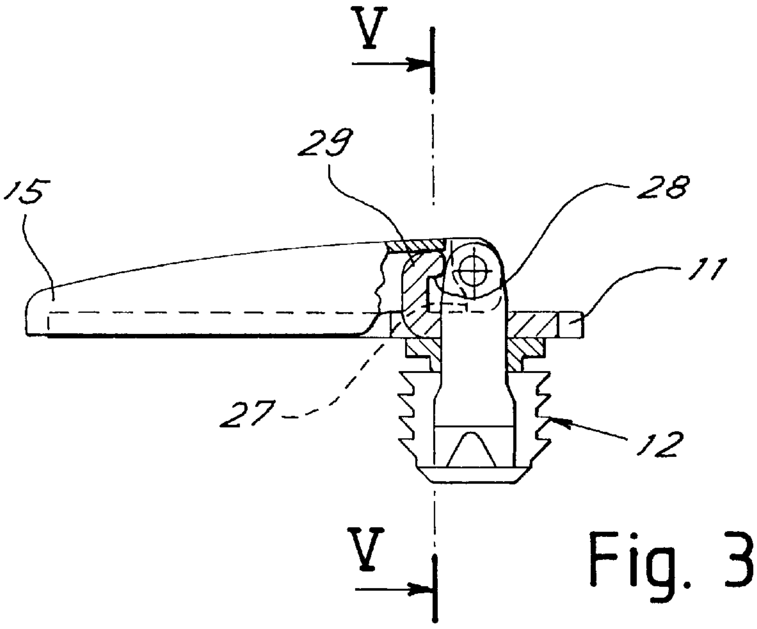
FIG. 3 is a view similar to the one in FIG. 2, but with the base in a fastened position.

Element 13 can be fastened to the base, also in an adjustable manner, by means of a screw 26, for example. Base 10 comprises a U-shaped lever 15 which has an arm 16 of the U conformation connected with expansion means of one of the anchors of the pair and the other arm 17 of the U conformation connected with expansion means of the other anchor of the pair, in a manner adapted to produce the simultaneous movement of both anchors between a non expansion position and an expansion position, on movement of lever 15 between a raised position (shown in FIG. 2) and a lowered position (shown in FIG. 3). The expansion means of the anchors comprises an insert 19 which is axially movable in the anchor to produce expansion of same.

In accordance with the embodiment shown, the lever arms have ends 20, 21 shaped as a cam which is eccentric relative to pivot pins 22, 23 for lever rotation so that the pivot pins move away from the base body when the lever is shifted from the raised position to the lowered position. By this movement carried out by the pivots, each insert is partially drawn out of the respective anchor so as to cause expansion thereof.

Figure 4:
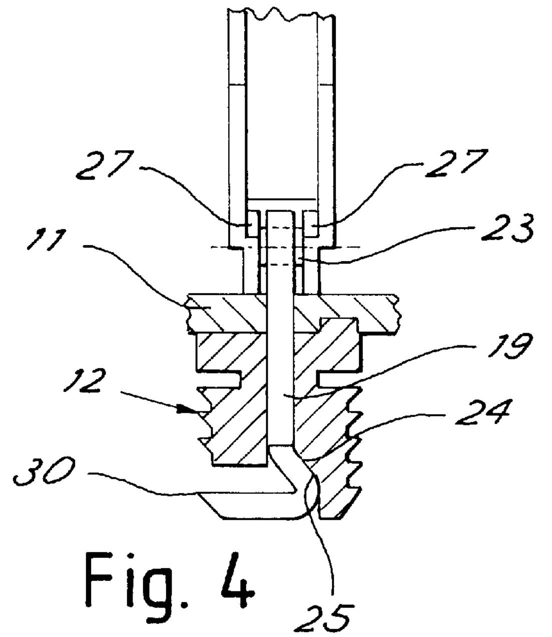
FIGS. 4 and 5 are views of details of the base taken along lines IV—IV and V—V, respectively.
Figure 5:
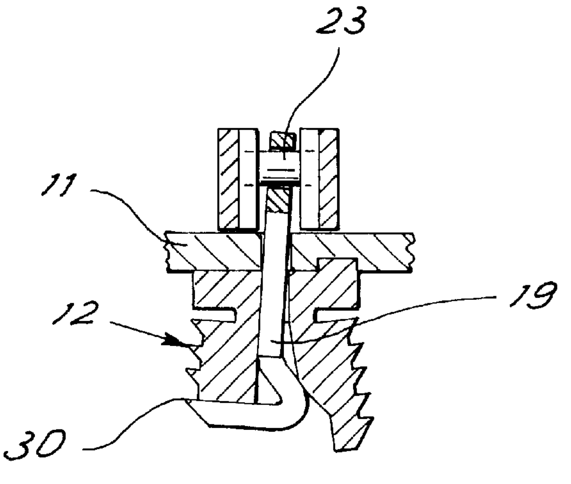

Still in accordance with the embodiment shown, this expansion effect can be obtained by conveniently shaping the inserts in order to have a cam surface 24 sliding on a corresponding cam surface 25 within the anchor, thereby causing two opposite portions of the anchor to move away from each other, as can be easily understood from a comparison between FIGS. 4 and 5.

Insert 19 can be provided with a thinned end 30 to bite into the hole wall and produce a pulling action ensuring a steady grip of the anchor without axial clearances. In the raised, non expanded position of the anchors, the lever acts as a handle for extraction of the base from the piece of furniture.

It should be noted that under this condition the extraction force is equally distributed on the anchors and is produced axially of the anchors. Thus, a correct and easy extraction of the anchors from the holes in the piece of furniture is allowed.

The lever 15 ends have abutments 27 that in the raised position of the lever bear against a corresponding abutment surface 28 of a tab 29 projecting from the base body 11, so as to constitute an end of the stroke to the lever rotation and, above all, a hindrance preventing the lever pivot pins from moving away upwardly; this upward movement is on the contrary free when the handle is not in a vertical position to enable expansion of the anchors. As a result of this, a pulling action on the handle in the vertical extraction position prevents occurrence of an undesirable expansion of the anchors. Tab 29 can be cut out and bent from the material of body 11, consisting of sheet metal for example.

The thrust action of abutments 27 on the tab 29 ensures that element 19 will be pushed to the position of non-expansion on the upward movement of the lever. Thus, use of elastic thrust elements that would increase cost and would not offer movement security is avoided.

At this point it is apparent that the intended purposes are achieved.

Obviously, the above description of an embodiment applying the innovatory principles of the invention is given by way of example only and is not to be considered as a limitation of the scope of the invention as herein claimed.

For instance, the fitting element 13 may be part of the base or the hinge depending on requirements. Fitting between element 13 and the hinge wing may take place in any known manner, by snap-coupling, bayonet-coupling, etc., for example.

What is claimed is:

1. A base for fastening of a hinge to a piece of furniture which comprises a body from which project, at the lower part thereof a pair of elastically expandable anchors for fastening the body to the piece of furniture and, at the upper part thereof an element for hooking of the hinge to the body, and including a U-shaped lever having a bottom section corresponding to the bottom of the U configuration, and having two spaced arms integral with and projecting from said bottom section and pivotally connected to said body section to make the lever rotatably movable between lifted and lowered positions, respectively, and having one arm of the U configuration thereof connected with expansion means of one of the anchors of the pair thereof, and the other arm of the U configuration connected with expansion means of the other anchor of said pair thereby to produce the simultaneous movement of both anchors between a non-expansion position and an expansion position, on movement of the U-shape; and lever between said lifted position and lowered position, respectively.

2. A base as claimed in claim 1, wherein the expansion means of each anchor comprises an insert axially slidable within the anchor and producing expansion of the anchor, on an axial movement thereof.

3. A base as claimed in claim 2, wherein the lever has said ends pivotally mounted, by means of pivot pins, to the slidable insert and provided with cam surfaces for moving the pivot pins away from the base body, on movement of the lever towards the lowered position to cause axial movement of the insert due to expansion of the anchor.

4. A base as claimed in claim 2, wherein the slidable insert has a first cam surface that, on axial movement of the insert, slides on a corresponding cam surface internal to the anchor to cause radial expansion of same.

5. A base as claimed in claim 3, wherein said lever ends have abutment surfaces that, in the raised position of the lever, bear against a corresponding abutment surface integral with the base body to prevent said pivot pins from moving apart, so that expansion of the anchors is avoided during use of the lever as an extraction handle of the base from the piece of furniture.

* * * * *